US009621286B2

United States Patent
Earls (10) Patent No.: US 9,621,286 B2
(45) Date of Patent: Apr. 11, 2017

(54) APPARATUS FOR GENERATION OF CORRECTED VECTOR WIDEBAND RF SIGNALS

(75) Inventor: Jeffrey D. Earls, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 451 days.

(21) Appl. No.: 13/172,541

(22) Filed: Jun. 29, 2011

(65) Prior Publication Data

US 2013/0003889 A1    Jan. 3, 2013

(51) Int. Cl.
*H04B 1/04*   (2006.01)
*H04B 17/00*  (2015.01)
*H04L 27/36*  (2006.01)
*H04B 17/11*  (2015.01)

(52) U.S. Cl.
CPC ......... *H04B 17/0085* (2013.01); *H04B 17/11* (2015.01)

(58) Field of Classification Search
CPC .. H04B 1/0475; H04B 17/0085; H04B 17/11; H04L 27/364
USPC ............... 375/296, 297; 455/114.3
See application file for complete search history.

(56) References Cited

U.S. PATENT DOCUMENTS

| | | | |
|---|---|---|---|
| 5,913,154 A * | 6/1999 | Wynn | 455/127.2 |
| 6,501,810 B1 * | 12/2002 | Karim et al. | 375/369 |
| 7,382,297 B1 * | 6/2008 | Kopikare et al. | 341/118 |
| 2006/0046665 A1 * | 3/2006 | Yang et al. | 455/114.3 |
| 2007/0241812 A1 * | 10/2007 | Yang et al. | 330/75 |
| 2008/0090531 A1 * | 4/2008 | Jungerman et al. | 455/126 |
| 2009/0054000 A1 * | 2/2009 | Waheed et al. | 455/63.1 |
| 2011/0170630 A1 * | 7/2011 | Silverman et al. | 375/296 |
| 2011/0261903 A1 * | 10/2011 | O'Brien et al. | 375/297 |
| 2012/0207229 A1 * | 8/2012 | Ananthaswamy | 375/259 |

* cited by examiner

*Primary Examiner* — David B. Lugo
(74) *Attorney, Agent, or Firm* — Michael A. Nelson; Kevin D. Dothager; Marger Johnson (57) ABSTRACT

A signal generation system can include an input source configured to provide an input radio frequency (RF) signal, a correction filter calculation (CFC) block configured to determine correction filter parameters, and an automatic level control (ALC) loop configured to provide ALC loop information to the CFC block. The correction filter parameters may be determined based at least in part on the ALC information. The system can also include a predistortion field programmable gate array (FPGA) configured to apply a correction filter to the input RF signal, wherein the correction filter is based at least in part on the correction filter parameters, and an RF output configured to provide an RF output signal.

20 Claims, 11 Drawing Sheets

APPARATUS FOR GENERATION OF CORRECTED VECTOR WIDEBAND RF SIGNALS

BACKGROUND

This disclosure relates to signal generators, and in particular, to a method and apparatus for correcting vector wideband radio frequency (RF) signals.

Currently available RF vector modulation generators tend to suffer from variable channel response as a function of frequency. As a result, users that require consistent response to characterize the performance of a particular unit must understand the distortions that it creates.

This is particularly a problem for users that wish to generate wideband signals that require substantially flat amplitude and linear phase response, such as RADAR pulses. For at least this reason, such users often rely on homebuilt "golden radios" as reference transmitters for system qualifications.

Accordingly, a need remains for equipment that is capable of providing NIST-traceable wideband generation capability with calibrated and corrected channel response.

SUMMARY

In certain embodiments, a radio frequency (RF) microwave signal generation system includes digital modulation correction that is applied as predistortion to compensate for channel amplitude and phase nonlinearities of analog hardware. A channel as used herein generally refers to the modulation bandwidth of the system as translated around the carrier frequency of the output. Such systems can be configured to correct for variability in amplitude level and flatness, phase linearity, in-phase and quadrature (IQ) errors, and modulator gain offset in a common set of complex finite impulse response (FIR) filters. Such systems can also correct for channel distortion in a system using an automatic level control (ALC) loop for channel/modulation bandwidths in excess of the ALC loop bandwidth.

In certain embodiments, the modulation bandwidth of the generator can have a range in hundreds of megahertz (MHz) or even a few gigahertz (GHz) while the RF carrier frequency will typically span from near DC to microwave or millimeter-wave ranges. Such systems will generally not include a digital acquisition subsystem.

In certain embodiments, a method includes regular regeneration and application of correction filters as one or more analog parameters change. Such analog parameters can include, but are not limited to, output frequency tuning, amplifier gain change with temperature, ALC attenuation or gain settings, RF IQ modulator gain and offset values, and RF output attenuator setting. The method can include recalculating and applying the correction filters in real-time or near-real-time in response to the generator's ALC system.

DETAILED DESCRIPTION

Embodiments include signal generators and techniques for correcting vector wideband radio frequency (RF) signals. These and other features and embodiments of the present invention proceed with reference to each of the figures.

Figure 1:
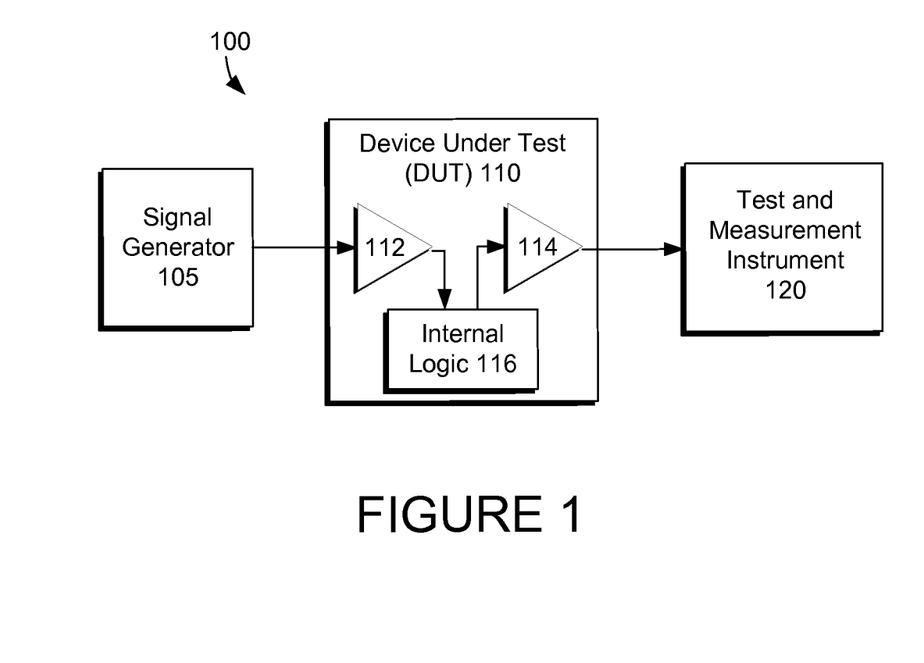
FIG. 1 illustrates a system including a signal generator, a device under test, and a test and measurement instrument.
Figure 2A:
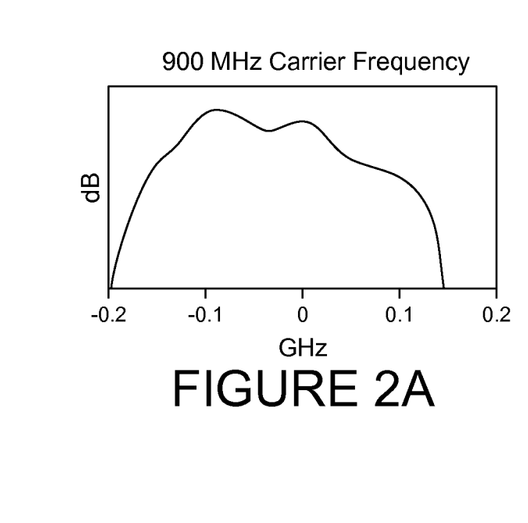
FIG. 2 illustrates multiple graphs showing signal distortion exhibited by a typical prior signal generator for a variety of carrier frequencies.
Figure 2B:
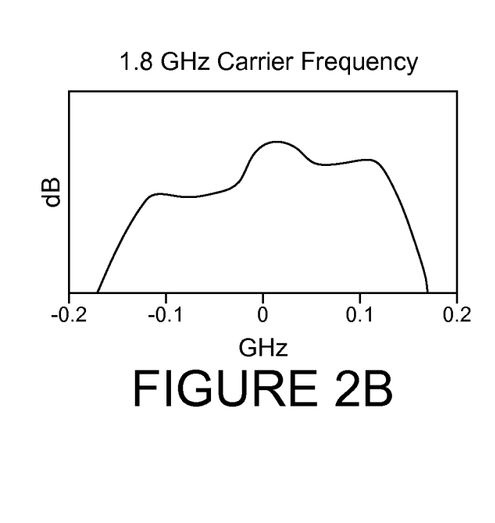
Figure 2C:
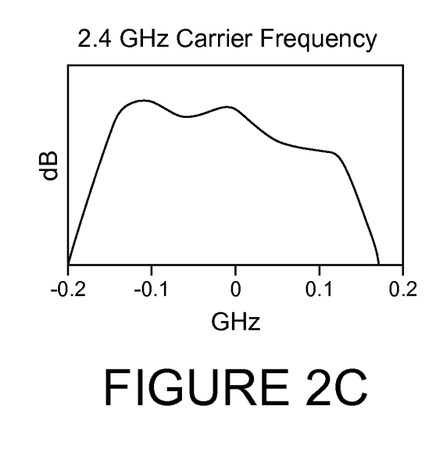
Figure 2D:
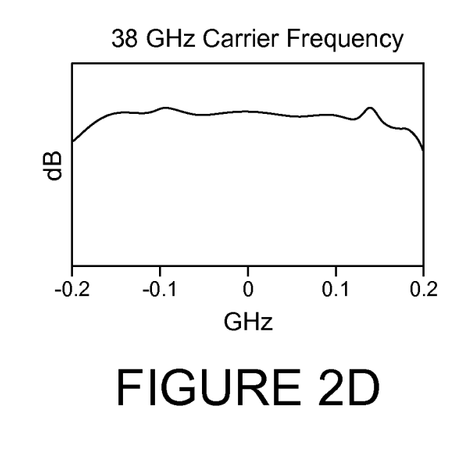
Figure 3A:
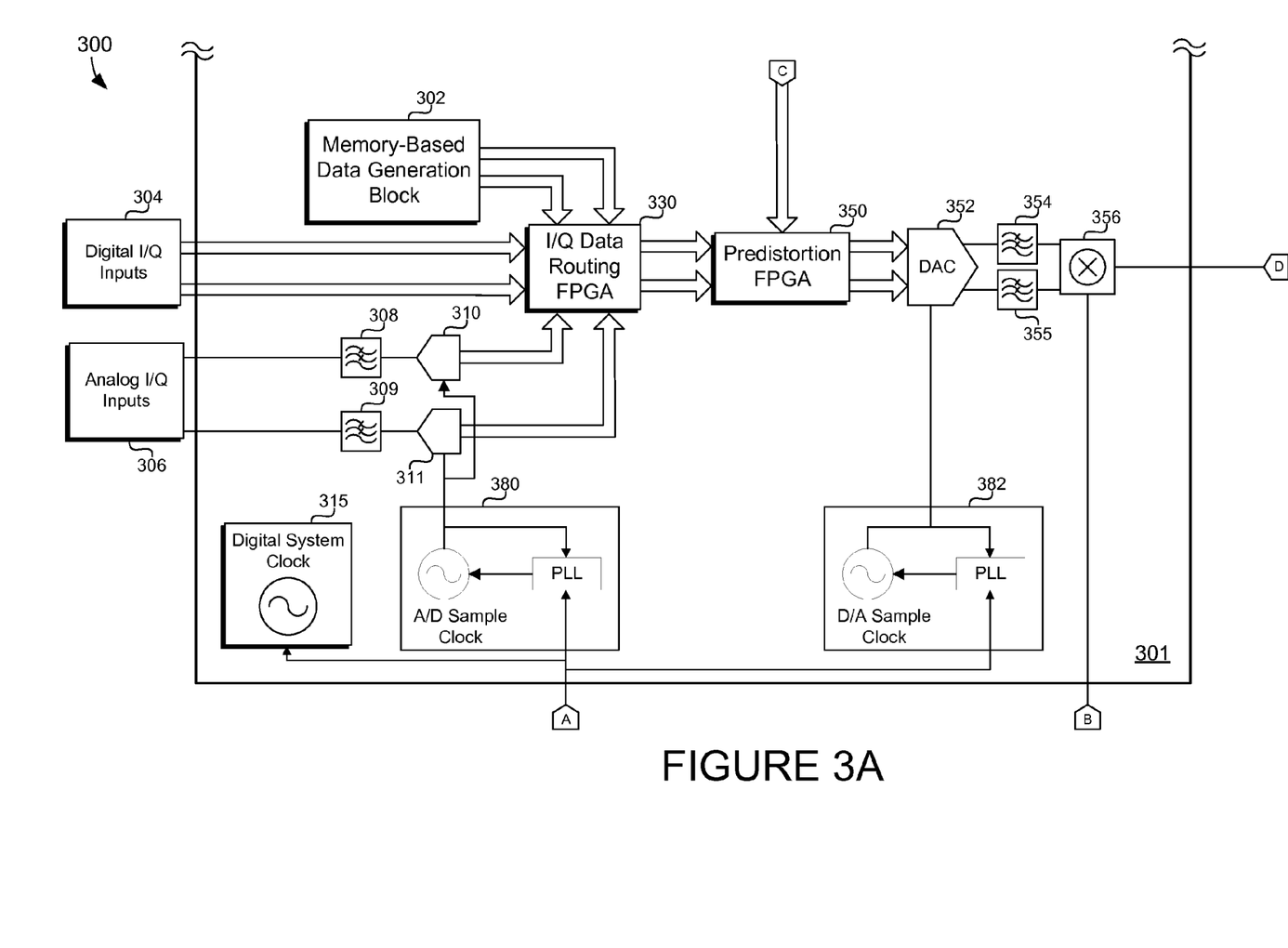
FIG. 3 illustrates a block diagram of a system including a signal generator, such as the signal generator of FIG. 1, according to an example embodiment of the present invention.
Figure 3B:
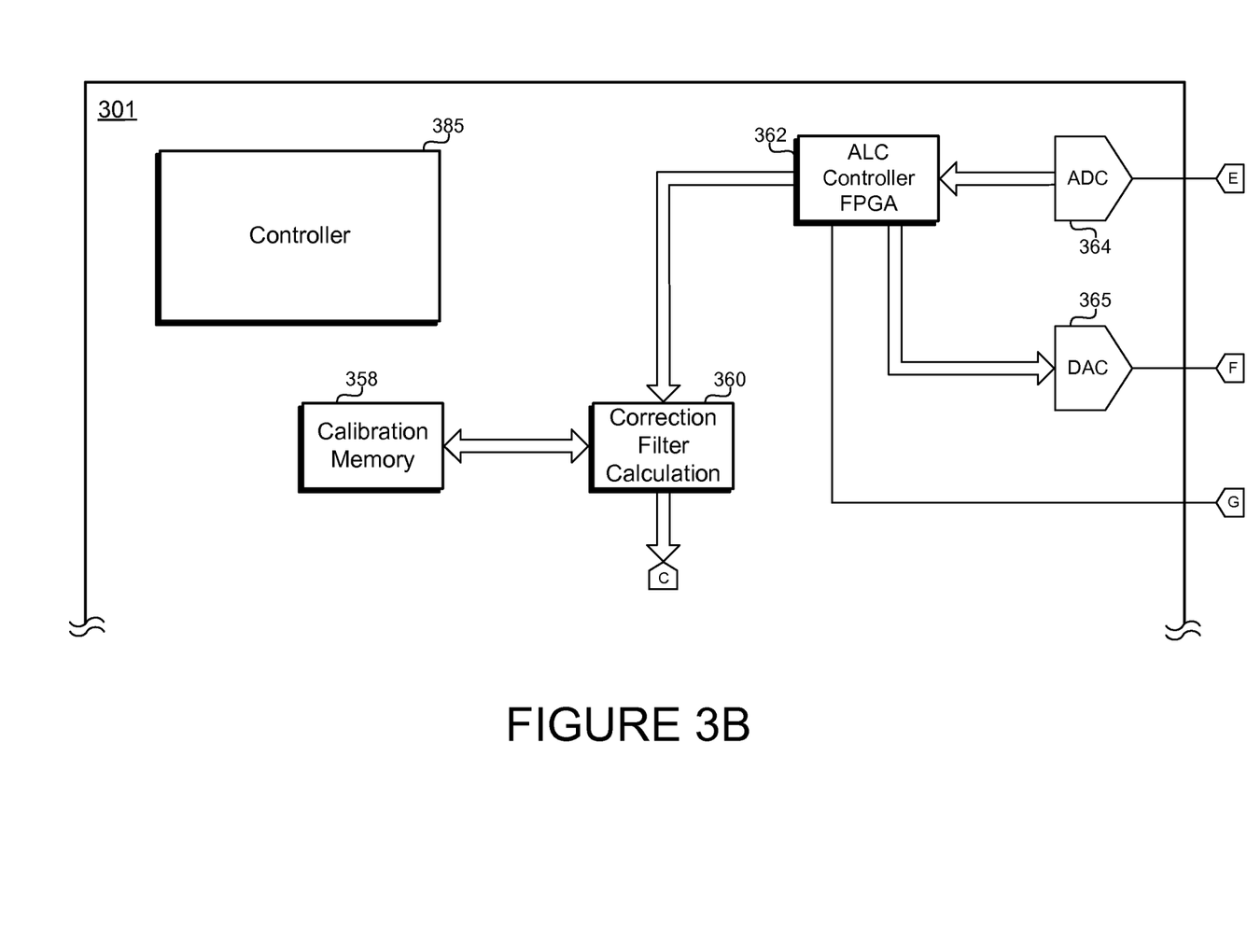
Figure 3C:
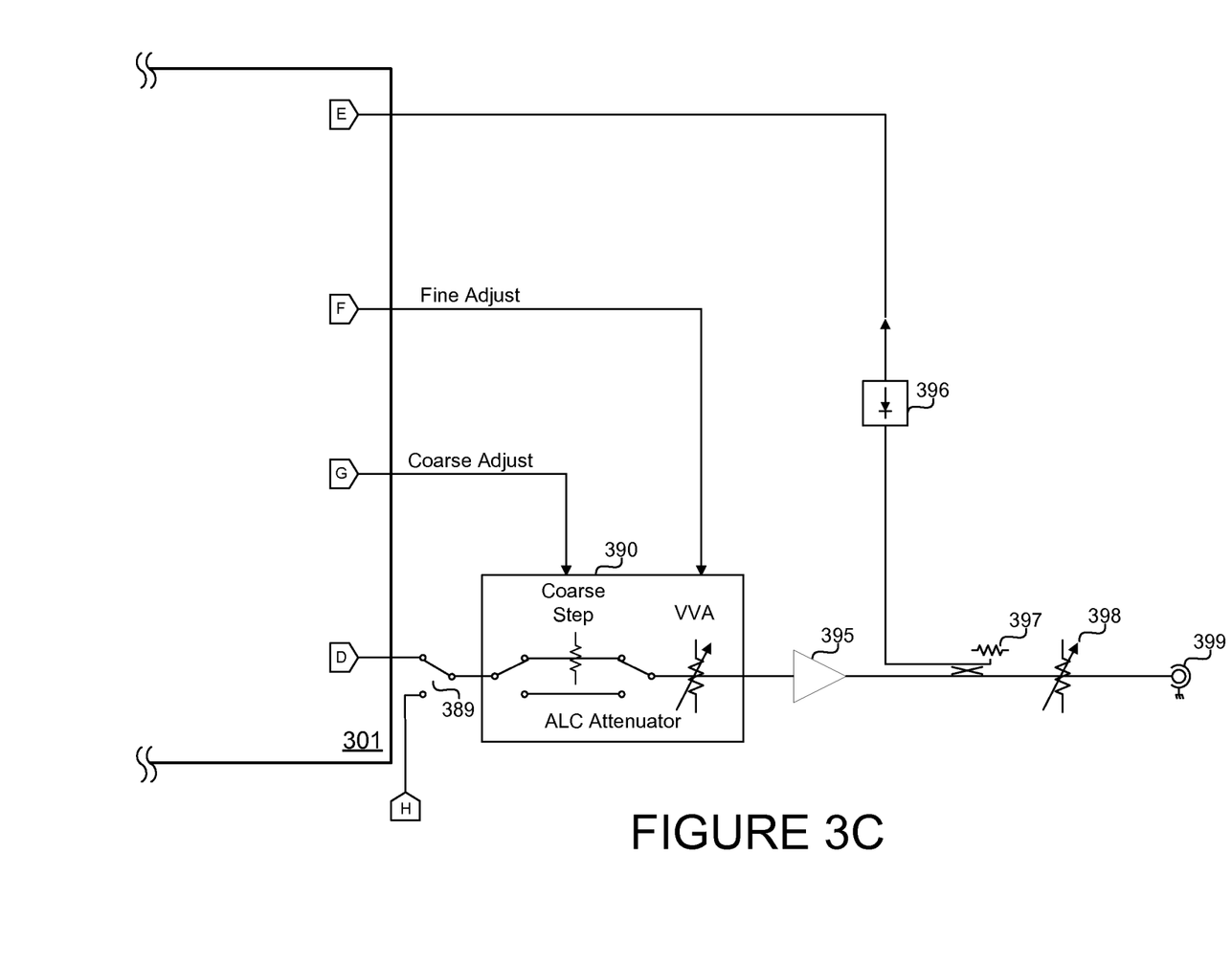
Figure 3D:
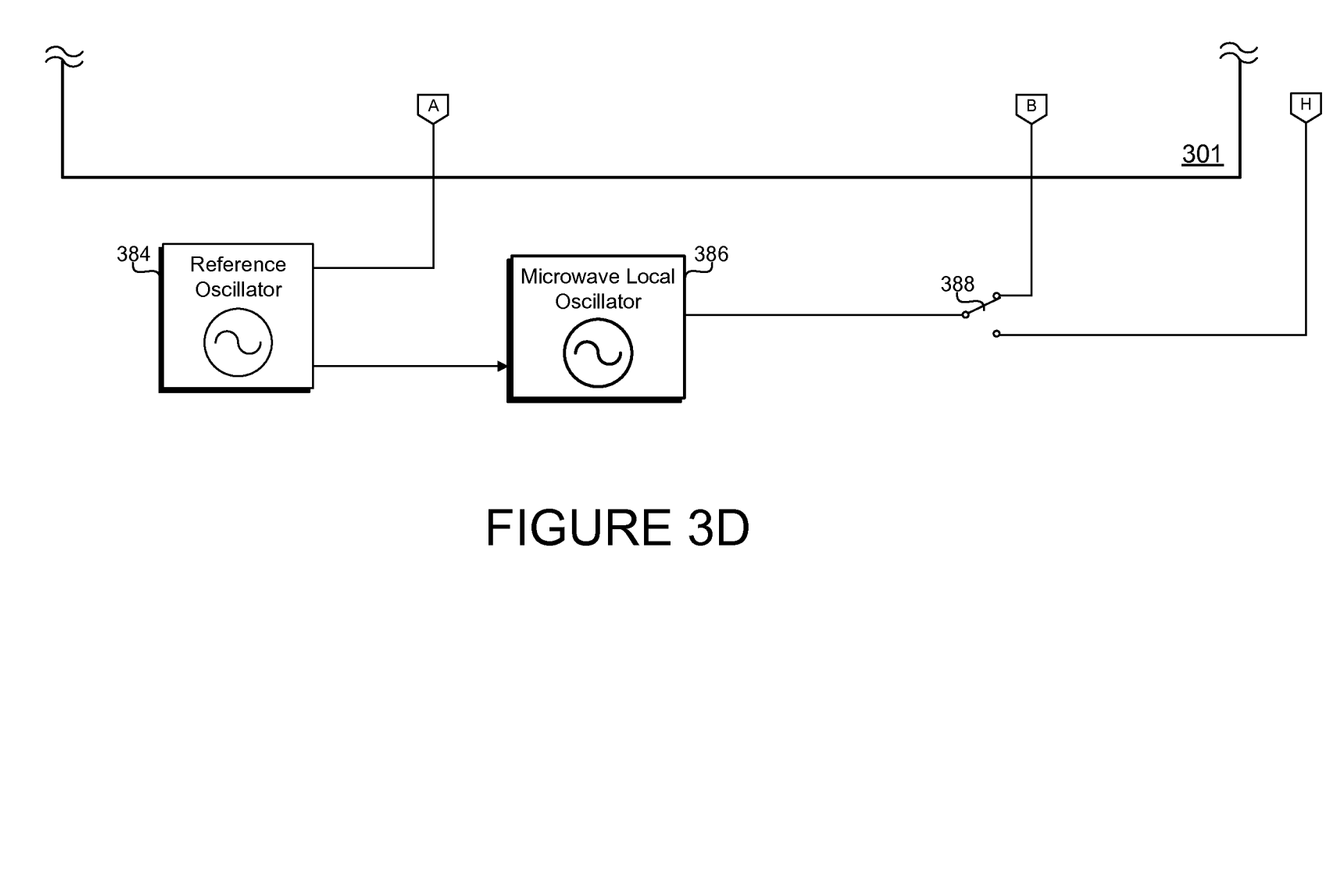

FIG. 1 illustrates a system 100 including a signal generator 105, a device under test (DUT) 110, and a test and measurement instrument 120. The signal generator 105 can be any suitable device capable of generating a signal, e.g., for testing purposes. The signal generator 105 can be, for example, a high speed serial generator such as an arbitrary waveform generator (AWG).

The DUT 110 can be any suitable digital or analog device capable of receiving and transmitting a signal. The DUT 110 can include, for example, a receiver 112, internal logic 116, and transmitter 114. An output of the DUT 110 can be coupled to a test and measurement instrument 120. The test and measurement instrument 120 can be an oscilloscope, a spectrum analyzer, a logic analyzer, a network analyzer, or the like.

FIG. 2 illustrates graphs showing signal distortion exhibited by a typical prior signal generator for a variety of carrier frequencies. The graphs of FIGS. 2A, 2B, 2C, and 2D illustrate channel response changes in a typical prior signal generator at RF carrier frequencies of 900 megahertz (MHz), 1.8 gigahertz (GHz), 2.4 GHz, and 38 GHz, respectively. The unflatness in each of the graphs 2A-2D demonstrate the need for wideband signal generation capability with calibrated and corrected channel response as provided by implementations of the disclosed technology described herein.

FIG. 3 illustrates a block diagram of a system 300 including a signal generator 301, such as the signal generator 105 of FIG. 1, according to an example embodiment of the present invention. Certain components that would typically be included in a complete instrumentation solution are omitted for simplification purposes. Such components include, but are not limited to, output harmonic rejection filters, user interfaces, and power supplies.

The system 300 includes three different data sources that are each configured to provide input data to the signal generator 301. The data sources include a memory-based data generation block 302, digital in-phase and quadrature (I/Q) inputs 304, and analog I/Q inputs 306. An I/Q data routing field programmable gate array (FPGA) 330 receives data from each of the data sources 302, 304, and 306.

In certain embodiments, the memory-based data generation block 302 is an internal functional equivalent of an arbitrary waveform generator (AWG) that runs stored data files directly from memory.

In certain embodiments, the data from the digital I/Q inputs 304 will consist of arbitrary real-time digital data streams having rates that may be constrained by the I/Q data routing FPGA 330.

In certain embodiments, the data from the analog I/Q inputs 306 will first pass through filters 308 and 309 that remove certain information, such as information that would cause alias images. The data may then pass from the filters 308 and 309 to analog-to-digital converters (ADCs) 310 and 311, respectively. The ADCs 310 and 311 may pass the output data to the I/Q data routing FPGA 330.

The signal generator 301 includes a predistortion FPGA 350, a digital-to-analog converter (DAC) 352, and an RF modulator 356. The predistortion FPGA 350 may receive input information from the I/Q data routing FPGA 330. The predistortion FPGA 350 applies a channel correction filter to each I and Q signal component in digital signal processing (DSP) before converting the data to analog by way of the DAC 352. In alternative embodiments, an application-specific integrated circuit (ASIC) or other suitable component may be used in place of an FPGA for application of the predistortion channel correction filters.

Alternately, the I/Q data routing FPGA 330 may receive a non-quadrature signal. Such a signal may be provided by the memory-based data generation block 302 to one of the I or Q inputs to the I/Q data routing FPGA 330. The non-quadrature signal is coupled to the predistortion FPGA 350 where a channel correction filter is applied to the signal.

In certain embodiment, the correction filters of the predistortion FPGA 350 compensates for amplitude unflatness and deviations from linear phase across the bandwidth of the output channel, i.e., the information bandwidth of the data irrespective of the modulated carrier frequency. The channel bandwidth can be no more than the Nyquist bandwidth of the DAC 352 and is typically much less than that. The predistortion FPGA 350 may adjust I/Q data sent to the DAC 352 to compensate for gain and phase imbalance in the RF modulator 356. Two filters 354 and 355 may further adjust data sent to the RF modulator 356 by removing DAC 352 alias products from the data.

Certain data passed on from the I/Q data routing FPGA 330 to the predistortion FPGA 350, such as data from the digital I/Q inputs 304, may be constrained by the processing speed of the predistortion FPGA 350 as well as the clock rate of the DAC 352.

The predistortion FPGA 350 of the signal generator 301 is configured to receive channel correction filter parameters from a correction filter calculation (CFC) block 360, which can be implemented as a custom FPGA, an ASIC, or code running on a host processor or controller 385.

The implementation of the CFC block 360 will typically depend on speed requirements in responding to changes in the performance of the RF/analog circuitry. An example of a requirement that would drive implementation as a custom FPGA or ASIC is an application of correction filters to signals that hop between frequencies that are farther apart than the bandwidth supportable by the DAC 352 alone.

The CFC block 360 of the signal generator 301 can use information from two sources: a calibration memory 358 and an automatic level control (ALC) controller FPGA 362. The calibration memory 358 can be any variety of memory. For example, the calibration memory 358 can be dynamic memory, static memory, read-only memory (ROM), random-access memory (RAM), or the like.

The calibration memory 358 generally stores calibration data as measured at the factory on NIST-traceable equipment. Such calibration data typically represents the analog channel performance of the signal generator 301 as measured at a multiplicity of RF carrier frequencies, output attenuator 398 settings, ALC attenuator 390 settings, and other RF signal path settings that may have an impact on the channel response of the system 300. The calibration data may be stored in the calibration memory 358 as a vector data describing the amplitude flatness and phase linearity at each frequency and setting.

In certain embodiments, the analog performance of the ALC attenuator 390 is calibrated at the factory with the data stored in the calibration memory 358 for in-use lookup by the controller 385 and CFC block 360.

The ALC controller FPGA 362 is part of an automatic control level ALC loop that includes the ALC attenuator 390, a directional coupler 397, and a power detector 396, such as a narrow-band envelope detector. The RF output from the ALC attenuator 390 is sampled through the use of the directional coupler 397 and provided to the power detector 396. The power detector 396 converts the sampled RF output to a baseband envelope voltage waveform. The baseband envelope voltage is digitized with an ALC ADC 364 and coupled to the ALC controller FPGA 362. The ALC controller FPGA 362 generates coarse and fine tuning values with the fine tuning values being converted to analog values by an ALC DAC 365. The coarse and fine tuning values are provided to the ALC attenuator 390 to maintain a nominal constant output power level.

The ALC ADC 364 and an ALC DAC 365 may require sample clocks that are not illustrated in the figure. The ALC controller FPGA 362 may operate based on a master digital system clock 315.

The ALC controller FPGA 362 is preferably configured to provide information to the CFC block 360 that indicates the ALC attenuator 390 settings so that the predistortion filter or filters can be correctly calculated as a function of ALC loop setting. The CFC block 360 accesses the calibration memory 358 to retrieve the previously stored calibration data relating to the ALC attenuator settings. Setting information from the ALC controller FPGA 362 may change rapidly.

In certain embodiments, an ALC mode includes a situation where minor adjustments are made when sampling output power at the 50% point of each pulse envelope in a long sequence of RF modulated pulses. Such a condition may require channel recalculation of correction filters for each pulse. Such channel recalculation is required in these embodiments due to changes in the ALC attenuator 390 input and output impedance as a function of attenuator setting.

In certain embodiments, the ALC controller FPGA 362 provides channel performance information, such as gain, amplitude flatness, and phase linearity, to the CFC block 360 when an alignment cycle is performed. Phase information can be determined through amplitude measurements and known internally-generated signals. These alignments are often required to compensate for changes in the analog performance of the system over time and changes in temperature. The alignments would use stored waveforms served by the memory-based data generation block 302. The CFC block 360 accesses the calibration memory 358 to retrieve the previously stored calibration data relating to the alignment cycle.

Other components may be relied on to support the general functioning of the system 300. For example, a reference oscillator 384 may serve as a master frequency reference and provide stable timing to an A/D sample clock 380, a D/A sample clock 382, a microwave local oscillator 386, and a master digital system clock 315. While the A/D sample clock 380 and D/A sample clock 382 can be the same oscillator in certain embodiments, they are shown as separate components in the figure to indicate that analog I/Q input and output modulation bandwidths can be different.

The microwave local oscillator 386 may provide the RF carrier signal for the RF modulator 356. This carrier signal can also bypass the RF modulator 356 using optional switches 388 and 389 for a continuous-wave (CW) mode output. An RF amplifier block 395 is shown to indicate that amplification may be present in the system 300 and that there may be frequency, channel, and temperature response issues that require calibration and correction.

A final output attenuator 398 may be implemented in the system 300 to give full power range at an RF output 399 beyond what the power detector 396 can measure. The final output attenuator 398 may also help control impedance and minimize amplitude uncertainty at the output source 399. The final output attenuator 398 may be calibrated for frequency response but is typically outside the loop of ALC gain control. The calibrated performance of the final output attenuator 398 may be stored in the calibration memory 358. Changes in performance of the final output attenuator 398 with regard to changes in temperature may be accounted for in a specification error budget as it is outside the internal alignment loop.

In certain embodiments, the controller 385 coordinates operation of all of the components implemented as part of the system 300 including, but not limited to, setting frequencies, loading FPGA images and data files, performing alignment sequences, controlling ALC modes, adjusting RF signal path settings, and informing the I/Q data routing FPGA 330 of the source from which it should take data at a given time or situation. For brevity and simplicity, interfaces from the controller 385 to various components of the system 300 are omitted from the figure.

Figure 4A:
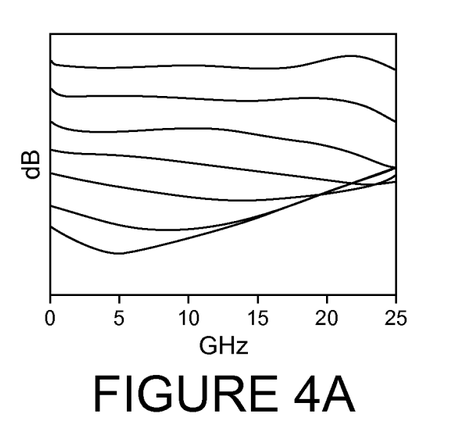
FIG. 4 illustrates multiple graphs showing changes in frequency and phase response as a function of attenuation setting for a typical prior voltage-variable attenuator as commonly used in an automatic level control (ALC) loop.
Figure 4B:
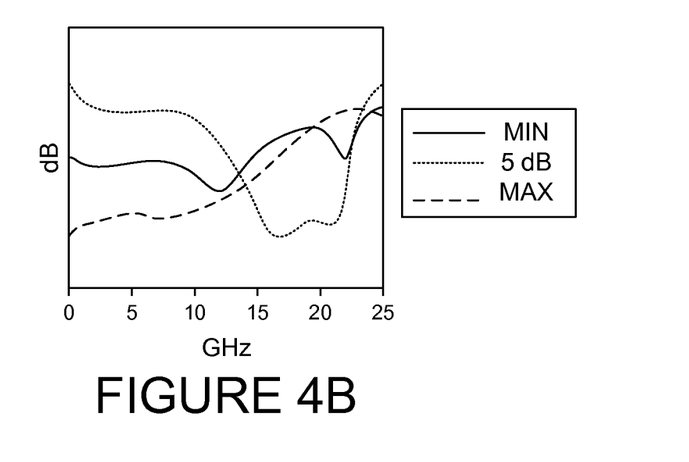
Figure 4C:
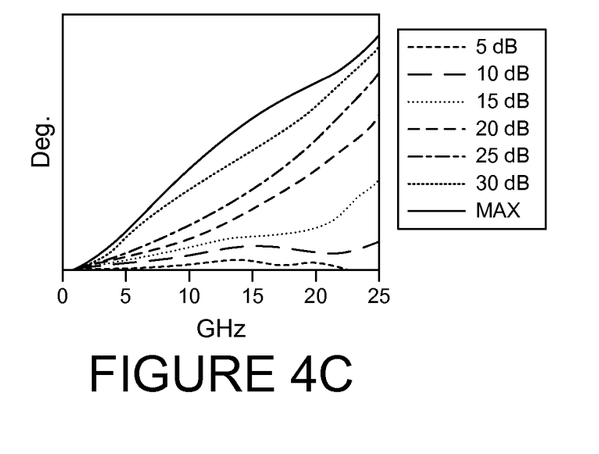

FIG. 4 illustrates multiple graphs 4A-4C that show changes in frequency and phase response as a function of attenuation setting for a typical prior voltage-variable attenuator. The graphs of FIGS. 4A, 4B, and 4C illustrate relative attenuation, return loss vs. attenuation, and relative phase, respectively.

The graphs 4A-4C demonstrate the need for recalculation of correction filters as a function of ALC settings. ALC loop bandwidths will typically run at low rates, e.g., in the kilohertz (kHz) range, where the modulation bandwidth can be at a significantly higher rate, e.g., in the gigahertz (GHz) range. A correction filter recalculation in accordance with embodiments of the disclosed technology may compensate for changes to channel performance outside the loop bandwidth of the ALC.

The graphs 4A-4C show significant changes in frequency and phase response as a function of attenuation setting. The changes in return loss vs. attenuation setting typically have an impact on amplitude and phase ripple when matched to adjoining elements of the system. For example, the point on the graph of FIG. 4B at approximately 19 GHz shows a change in return loss from roughly −13 dB to −25 dB when the attenuation is changed from the minimum, i.e., 2.2 dB, to 5 dB. If matched with an element with a flat −20 dB return loss, that change in mismatch causes amplitude errors that swing from ±0.2 dB to ±0.05 dB and phase errors that change from ±1.28 degrees to ±0.32 degrees. These are channel amplitude and phase errors that are combined on top of the raw frequency and phase response changes of the attenuator as a function of ALC setting. These effects get markedly worse when channel bandwidths are extended into the hundreds of megahertz (MHz) and beyond.

Figure 5A:
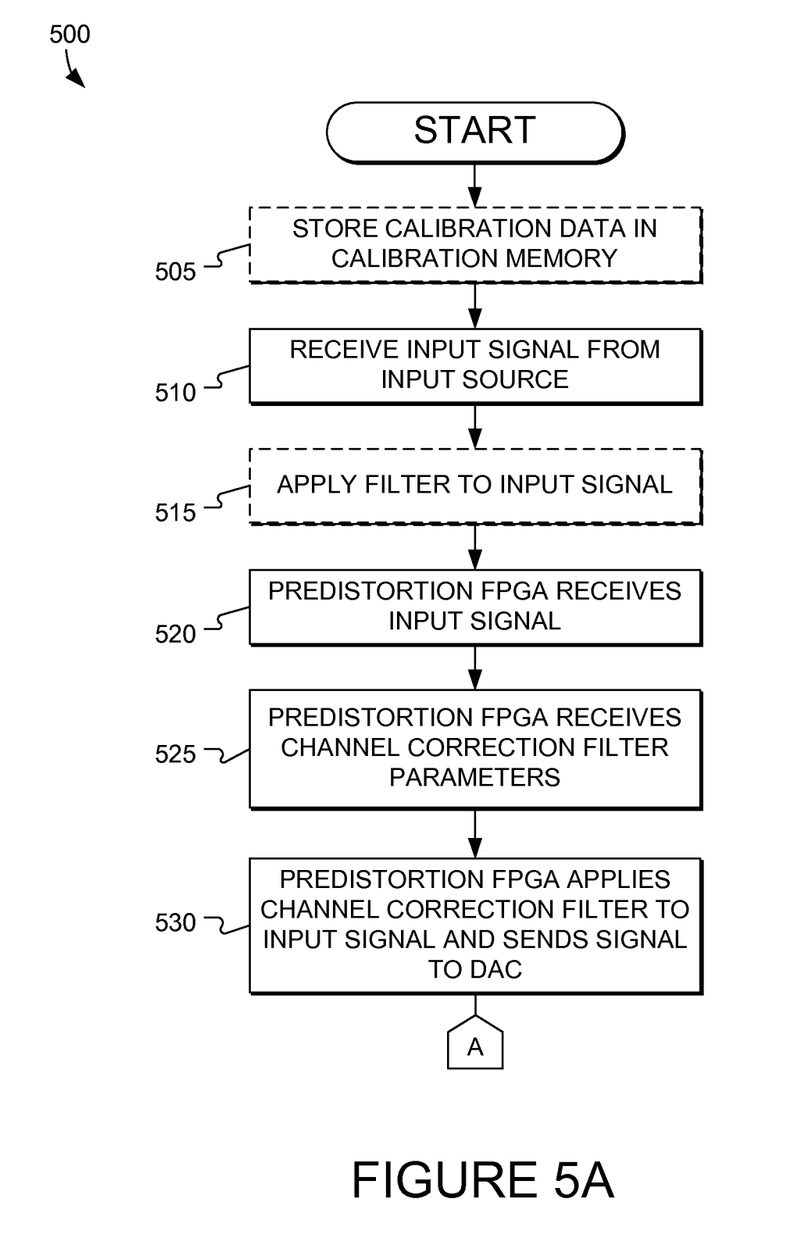
FIGS. 5A and 5B illustrate a flow diagram of an example technique for correcting generated vector wideband RF signals according to some example embodiments of the present invention.
Figure 5B:
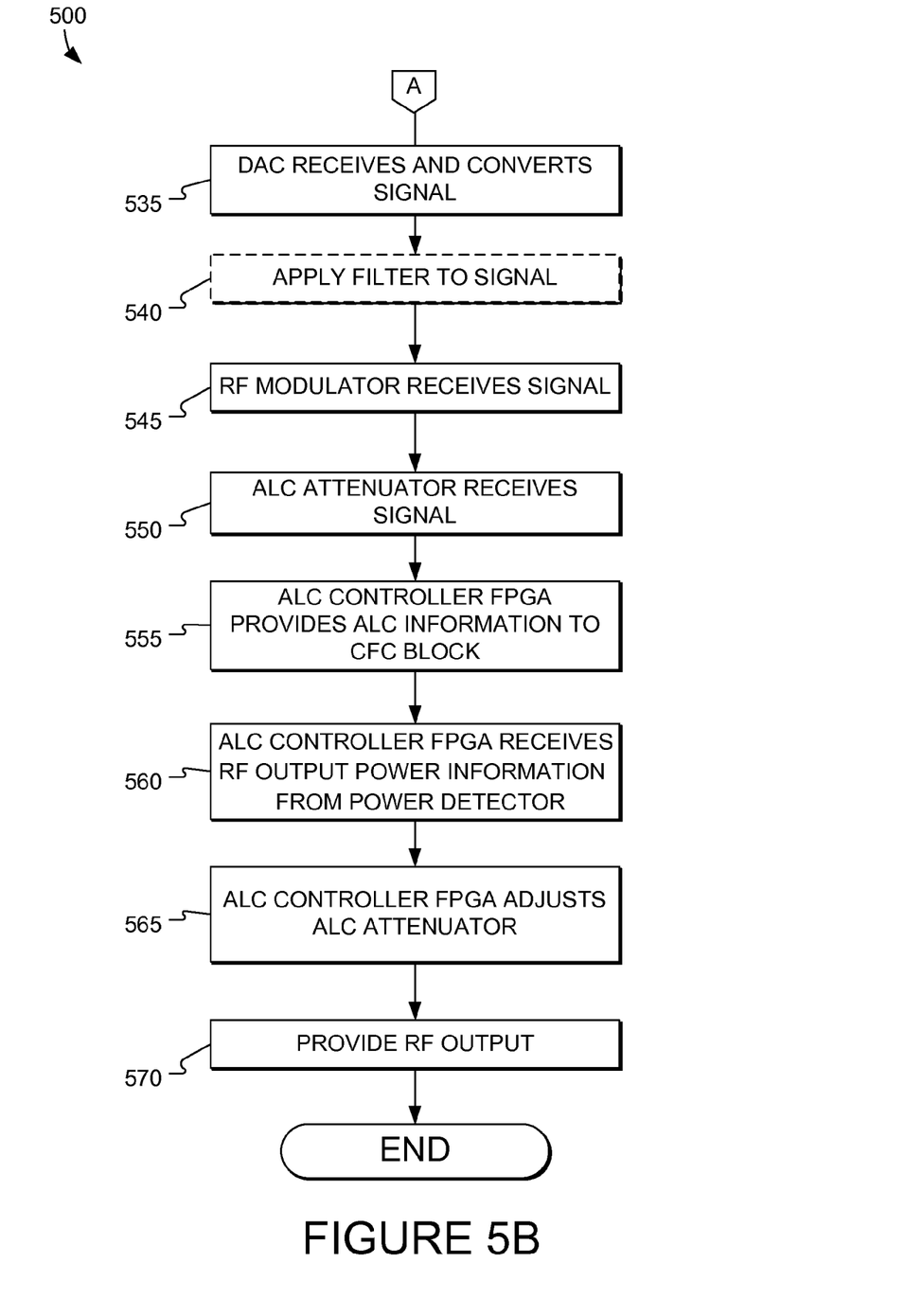

FIG. 5 illustrates a flow diagram 500 of an example technique for correcting generated vector wideband RF signals according to some example embodiments of the present invention.

As a preparatory step, calibration data can be stored in a calibration memory 358, as shown at 505. At 510, an input signal from an input source is received by a signal generator 301. The input source may be a memory-based data generation block 302, digital I/Q inputs 304, or analog I/Q inputs 306, for example. The input signal may be I/Q quadrature signal or a non-quadrature signal. In certain embodiments, the input signal is received by an I/Q data routing FPGA 330 of the signal generator 301. The input signal may be optionally filtered, as shown at 515, before being sent to a predistortion FPGA 350. At 520, the predistortion FPGA 350 receives the input signal.

At 525, the predistortion FGPA 350 receives channel correction filter parameters from a correction filter calculation (CFC) block 360. The CFC block 360 may be implemented as a custom FPGA, ASIC, or code running on the host processor, for example. Depending on the particular implementation, the step shown at 525 may happen before, during, or after the step shown at 520.

At 530, the predistortion FPGA 350 applies one or more predistortion correction filters, e.g., a channel correction filter, to the input signal before sending it to a DAC 352. The correction filter or filters may compensate for amplitude unflatness and deviations from linear phase across the bandwidth of the output channel, for example. The correction filter or filters may be recalculated and applied in real-time or near-real-time in response to an automatic level control (ALC) system. The ALC system typically includes an ALC attenuator 390, directional coupler 397, power detector 396, and an ALC controller FPGA 362.

At 535, the DAC 352 receives and converts the signal or signals from digital to analog before sending the signal or signals to an RF modulator 356. At 545, the signal or signals are received by the RF modulator 356. The signal or signals may be optionally filtered before being sent to the RF modulator 356, as shown at 540. The signal from the RF modulator 356 is then received by the ALC attenuator 390, as shown at 550.

At 555, the ALC controller FPGA 362 provides ALC information to the CFC block 360. In certain embodiments, the ALC information indicates the ALC attenuator settings so that the predistortion filter or filters applied by the predistortion FPGA 350 may be correctly calculated as a function of ALC loop setting. The system may use the ALC loop for channel/modulation bandwidths in excess of the ALC loop bandwidth. In certain embodiments, the ALC controller FPGA 362 may also provide the CFC block 360 with channel performance information such as gain, amplitude flatness, and phase linearity.

At 560, the ALC controller FPGA 362 receives RF output power information from a power detector 396. At 565, the ALC controller FPGA 362 adjusts the ALC attenuator 390 so as to maintain a constant output power level. In various embodiments, either or both of the steps shown at 560 and 565 may happen before, concurrent with, or after the step shown at 555.

At 570, the RF output 399 is provided by the signal generator.

Although particular embodiments have been described, it will be appreciated that the principles of the invention are not limited to those embodiments. Variations and modifications may be made without departing from the principles of the invention as set forth in the following claims. As an example, the invention may be implemented at baseband without the use of the RF modulator. In such an implementation, the correction filters in the predistortion FPGA 350 compensate for amplifier gain and phase distortions in the signal channel.

What is claimed is:

1. A signal generation system, comprising:
an input source configured to provide an input signal;

a calibration memory configured to store calibration data pertaining to an analog channel performance of the signal generation system across various frequencies and system settings of the signal generation system, wherein the calibration data includes an effect of various automatic level control attenuator settings on the analog channel performance;

a correction filter calculation block configured to determine correction filter parameters for the signal generation system based on the calibration data;

a predistortion component configured to receive the input signal and correction filter parameters and generate a filtered output signal through application of a correction filter to the input signal, wherein the correction filter is based at least in part on the correction filter parameters; and an automatic level control loop including:
an automatic level control attenuator configured to receive the filtered output signal and output an attenuated output signal, and
an automatic level control controller configured to provide an indicator of a current setting of the automatic level control attenuator to the correction filter calculation block, wherein the correction filter parameters are further determined based at least in part on the current setting of the automatic level control attenuator.

2. The signal generation system of claim 1, wherein the input source is a memory-based data generation block, a digital in-phase and quadrature (I/Q) input, or an analog I/Q input.

3. The signal generator system of claim 2, wherein the correction filter is a first correction filter, and further comprising a second correction filter, wherein the predistortion component is further configured to apply the first correction filter to an in-phase component of the input signal and the second correction filter to a quadrature component of the input signal, and wherein the second correction filter is also based at least in part on the correction filter parameters.

4. The signal generation system of claim 1, wherein the attenuated output signal is a first attenuated output signal, the signal generation system further comprising:
an output attenuator configured to receive the attenuated output signal from the automatic level control attenuator and output a second attenuated output signal; and
a radio frequency output configured to provide a radio frequency output signal based on the second attenuated output signal.

5. The signal generation system of claim 1, further comprising:
a power detector configured to provide the automatic level control controller with power information pertaining to the attenuated output signal, wherein the automatic level control controller is further configured to adjust settings of the automatic level control attenuator, based on the power information, to cause the automatic level control attenuator to maintain a constant output power level.

6. The signal generation system of claim 5, wherein the automatic level control controller is further configured to update the indicator of the current setting of the automatic level control loop attenuator to reflect the adjusted settings of the automatic level control attenuator, and wherein the correction filter calculation block is further configured to update the correction filter parameters to reflect the adjusted settings of the automatic level control attenuator.

7. The signal generation system of claim 1, further comprising:
a digital-to-analog converter configured to generate an analog output signal based on the filtered output signal.

8. The signal generation system of claim 7, further comprising:
an RF modulator coupled between the digital-to-analog converter and the automatic level control attenuator.

9. The signal generation system of claim 8, further comprising:
an intermediate filter coupled between the digital-to-analog converter and the RF modulator.

10. The signal generation system of claim 1, wherein the predistortion component comprises a field programmable gate array.

11. The signal generation system of claim 1, wherein the predistortion component comprises an application-specific integrated circuit.

12. The signal generation system of claim 1, wherein the calibration data is measured at a factory and includes vector data describing amplitude flatness and phase linearity at each frequency setting for one or more of the various automatic level control attenuator settings.

13. A method for correcting radio frequency (RF) signals in a signal generation system, the method comprising:
receiving an input RF signal from an input source;
receiving, by a correction filter calculation block, an indicator of a current setting of an automatic level control attenuator;
receiving, by the correction filter calculation block, calibration data pertaining to an analog channel performance of the signal generation system across various frequencies and system settings of the signal generation system, the calibration data including an effect of various automatic level control attenuator settings on the analog channel performance;
determining, by the correction filter calculation block, correction filter parameters based at least in part on the indicator of the current setting of the automatic level control attenuator and the calibration data and
generating, by a predistortion component, a filtered RF signal by applying a correction filter to the input RF signal, wherein the correction filter is based on the correction filter parameters.

14. The method of claim 13, wherein the input RF signal has in-phase and quadrature signal components, and wherein the generating a filtered RF signal step further comprises generating respective in-phase and quadrature filtered RF signals by applying an in-phase component correction filter to the in-phase signal component of the input RF signal and a quadrature component correction filter to the quadrature signal component of the input RF signal, wherein the in-phase component correction filter and the quadrature component correction filter are both based on the correction filter parameters.

15. The method of claim 13, further comprising:
receiving, by an automatic level control controller, RF power information pertaining to an output of the automatic level control attenuator;
adjusting automatic level control attenuator settings to cause the automatic level control attenuator to maintain a constant output power level;
updating the indicator of the current setting of the automatic level control attenuator to reflect the adjusted automatic level control attenuator settings;
re-determining the control filter parameters based on the updated indicator; and generating an updated filtered RF signal by applying an updated correction filter to the input RF signal, wherein the updated correction filter is based on the re-determined correction filter parameters.

16. The method of claim 13, further comprising:
providing the filtered RF signal to an RF modulator; and
generating an RF signal modulated by the filtered RF signal.

17. The method of claim 16, wherein the filtered RF signal comprises in-phase and quadrature signal components.

18. One or more non-transitory computer-readable media having instructions stored thereon which, when executed by one or more processors of a signal generation system cause the signal generation system to:
receive an input signal from an input source;
receive an indicator of a current setting of an automatic level control attenuator;
receive calibration data pertaining to an analog channel performance of the signal generation system across various frequencies and system settings of the signal generation system, the calibration data including an effect of various automatic level control attenuator settings of the automatic level control attenuator on the analog channel performance;
determine correction filter parameters based at least in part on the current setting of the automatic level control attenuator and the calibration data; and
generate a filtered signal by applying a correction filter to the input signal, wherein the correction filter is based on the correction filter parameters.

19. The one or more non-transitory computer-readable media of claim 18, wherein the instructions, when executed by the one or more processors, further cause the signal generation system to:
receive power information pertaining to an output of the automatic level control attenuator;
adjust the current setting of the automatic level control attenuator to cause the automatic level control attenuator to maintain a constant output power level;
update the indicator to reflect the adjusted current setting of the automatic level control attenuator;
re-determine the control filter parameters based on the updated indicator; and
generate an updated filtered signal by applying an updated correction filter to the input signal, wherein the updated correction filter is based on the re-determined correction filter parameters.

20. The one or more non-transitory computer-readable media of claim 18, wherein the calibration data was measured at a factory and includes vector data describing amplitude flatness and phase linearity at each frequency setting for each of the various automatic level control attenuator settings.

* * * * *

UNITED STATES PATENT AND TRADEMARK OFFICE
CERTIFICATE OF CORRECTION

PATENT NO. : 9,621,286 B2
APPLICATION NO. : 13/172541
DATED : April 11, 2017
INVENTOR(S) : Jeffrey D. Earls Page 1 of 1

It is certified that error appears in the above-identified patent and that said Letters Patent is hereby corrected as shown below:

In the Claims

Claim 15, Column 8, Line 66, replace "control" with --correction--.

Claim 19, Column 10, Line 15, replace "control" with --correction--.

Signed and Sealed this
Thirteenth Day of November, 2018

Andrei Iancu
*Director of the United States Patent and Trademark Office*